(12) United States Patent
Snider et al.

(10) Patent No.: US 9,128,005 B2
(45) Date of Patent: Sep. 8, 2015

(54) METALIZED CERAMIC LEADING EDGE NOZZLE KIELS FOR HIGH-TEMPERATURE TURBINE APPLICATIONS

(71) Applicant: General Electric Company, Schenectady, NY (US)

(72) Inventors: Zachary John Snider, Simpsonville, SC (US); Kirk Douglas Gallier, Greenville, SC (US); Jacob John Kittleson, Houston, TX (US); Burt Richard Skiba, East Lansing, MI (US)

(73) Assignee: General Electric Company, Schenectady, NY (US)

( * ) Notice: Subject to any disclaimer, the term of this patent is extended or adjusted under 35 U.S.C. 154(b) by 551 days.

(21) Appl. No.: 13/632,842

(22) Filed: Oct. 1, 2012

(65) Prior Publication Data

US 2014/0090457 A1    Apr. 3, 2014

(51) Int. Cl.
*G01L 7/00* (2006.01)
*G01L 1/00* (2006.01)
*G01M 15/00* (2006.01)
*G01M 15/14* (2006.01)
*G01L 23/24* (2006.01)

(52) U.S. Cl.
CPC ............... *G01M 15/14* (2013.01); *G01L 23/24* (2013.01)

(58) Field of Classification Search
None
See application file for complete search history.

(56) References Cited

U.S. PATENT DOCUMENTS

| | | | | |
|---|---|---|---|---|
| 4,203,197 A | * | 5/1980 | Crandell | 29/611 |
| 4,278,828 A | * | 7/1981 | Brixy et al. | 136/232 |
| 4,404,172 A | * | 9/1983 | Gault | 117/223 |
| 4,433,584 A | | 2/1984 | Kokoszka et al. | |
| 4,702,941 A | | 10/1987 | Mitchell et al. | |
| 4,848,643 A | | 7/1989 | Frische et al. | |
| 5,344,337 A | * | 9/1994 | Ritter | 439/447 |
| 5,445,725 A | * | 8/1995 | Koide et al. | 205/790 |
| 5,584,578 A | * | 12/1996 | Clauss, Jr. | 374/140 |
| 6,892,584 B2 | * | 5/2005 | Gilkison et al. | 73/736 |
| 7,137,297 B2 | * | 11/2006 | Giterman | 73/170.02 |
| 7,201,067 B2 | * | 4/2007 | Kurtz et al. | 73/861.65 |
| 7,716,980 B1 | * | 5/2010 | Colten et al. | 73/170.02 |
| 8,035,822 B2 | * | 10/2011 | Riza et al. | 356/519 |
| 8,141,413 B2 | * | 3/2012 | Konstandopoulos et al. | 73/114.71 |
| 8,146,445 B2 | * | 4/2012 | Ferri et al. | 73/863.23 |
| 8,356,741 B2 | | 1/2013 | Uihlein et al. | |
| 2004/0112945 A1 | | 6/2004 | Wolfgram et al. | |
| 2012/0012896 A1 | | 1/2012 | Venkatraman et al. | |

* cited by examiner

*Primary Examiner* — Peter Macchiarolo
*Assistant Examiner* — Jermaine Jenkins
(74) *Attorney, Agent, or Firm* — Nixon & Vanderhye P.C.

(57) ABSTRACT

A pressure probe includes an elongated cable provided with a sensing tip, a portion of the elongated cable and sensing tip enclosed within a ceramic shroud, the ceramic shroud at least partially formed of a metalized ceramic material.

Figure 1:
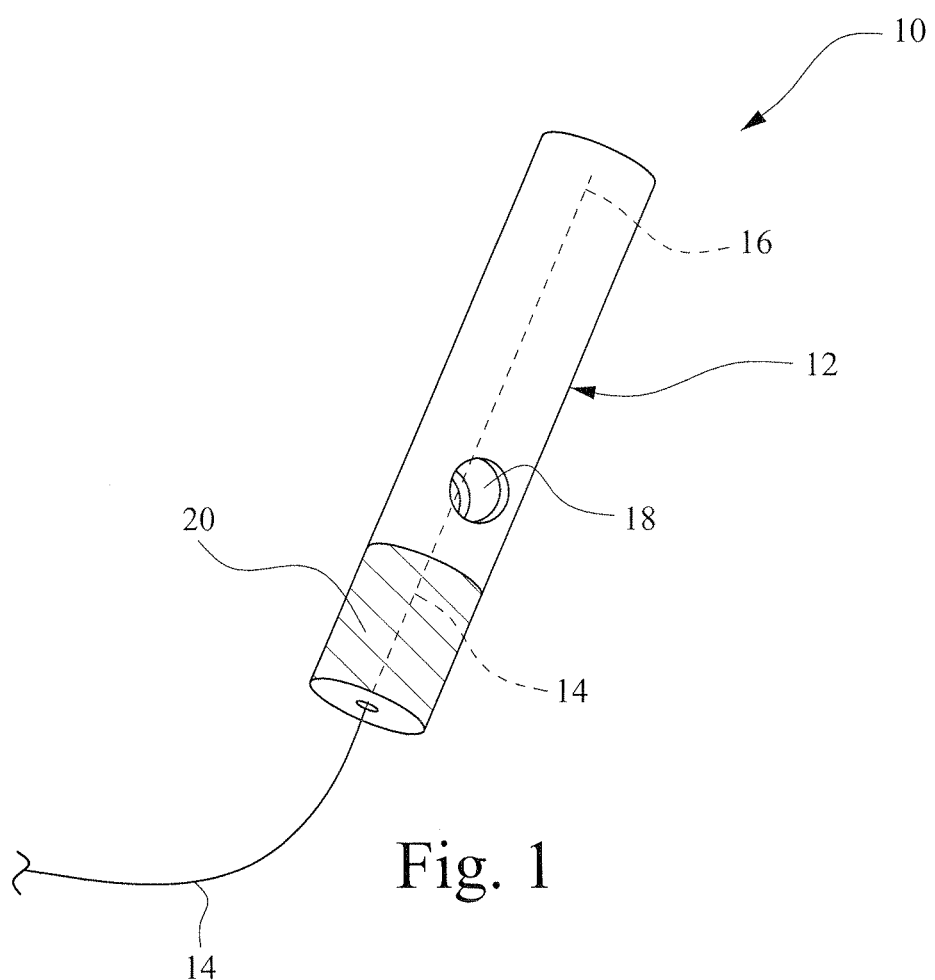

20 Claims, 4 Drawing Sheets

METALIZED CERAMIC LEADING EDGE NOZZLE KIELS FOR HIGH-TEMPERATURE TURBINE APPLICATIONS

BACKGROUND OF THE INVENTION

This invention relates generally to gas turbine monitoring and testing practices and, more specifically, to a metalized ceramic Kiel-type pressure sensor used to gather total pressure and/or total temperature data from the surrounding flow in the hot gas path of a turbine engine.

Kiel-type pressure sensor probes are often used to measure total pressure in a fluid environment where the direction of flow is not known or changes with operating conditions. Associated pressure tubing connects the probe to a transducer where the pressure measurement is translated to a signal for routing to a data acquisition system. The Kiel-style probe has a shroud to protect the pressure tubing. The shroud makes the probe insensitive to a range of yaw and pitch angles because the flow is straightened as it enters the probe. Kiel-style probes can be installed in a variety of turbine components/locations, for example, in a low-pressure steam-turbine exhaust duct, enabling measurement of the total pressure distribution exiting the last-stage row of buckets during performance testing. U.S. Pat. No. 4,433,584 exemplifies the use of a plurality of Kiel-style probes (referred to hereinafter as “Kiel probes”) on a rake downstream of a turbine section. In addition, Kiel probes are sometimes mounted in the hot gas path of the turbine. i.e., on components of the gas turbine that are contacted by the hot combustion gases, especially in the first and second stages of the gas turbine.

Traditional Kiel probe shrouds or housings used in gas turbine applications, and especially those mounted on nozzles in the hot gas path, have been made from high-temperature alloys. Even these high-temperature alloys, however, cannot withstand the temperature in the first stage and sometimes even in the second stage of modern gas turbines where temperatures can reach 2300° F. Unless active cooling schemes are employed to cool the metal alloy shrouds, the shrouds may well disintegrate under the extremely high temperatures. While platinum is an option for the shroud composition, it is very expensive and thus rarely if ever used in Kiel probe applications.

Ceramic materials, while able to withstand the high temperatures in the hot gas path of the gas turbine, are difficult to bond to the host metal alloy nozzle or other metal alloy turbine component.

There remains a need therefore, for a relatively low-cost Kiel probe shroud construction that will survive the high-temperature environment of a gas turbine hot gas path.

BRIEF SUMMARY OF THE INVENTION

In accordance with an exemplary but nonlimiting embodiment, there is provided a pressure probe comprising an elongated cable provided with a sensing tip, a portion of the elongated cable and the sensing tip enclosed within a ceramic shroud, the ceramic shroud having at least a portion thereof metalized to facilitate bonding to a metal component.

In another aspect, the present invention provides pressure probe assembly capable of withstanding temperatures up to about 2300° comprising at least one pressure probe secured to a component, the pressure probe comprising an elongated cable provided with a sensing tip, a portion of the elongated cable and the sensing tip enclosed within a silicon carbide ceramic shroud, the silicon carbide ceramic shroud having at least a portion thereof metalized; the metalized portion of the silicon carbide ceramic shroud brazed to the metal component.

In still another exemplary but nonlimiting aspect, the present invention provides a pressure probe assembly capable of withstanding temperatures up to about 2300° comprising at least one pressure probe secured to a metal alloy gas turbine hot gas path component, the pressure probe comprising an elongated cable provided with a sensing tip, a portion of the elongated cable and the sensing tip enclosed within a silicon carbide ceramic shroud, the silicon carbide ceramic shroud having at least a portion thereof metalized; the metalized portion of the silicon carbide ceramic shroud brazed to the metal alloy gas turbine hot gas path component.

The invention will now be described in greater detail in conjunction with the drawings identified below.

BRIEF DESCRIPTION OF THE DRAWINGS

FIG. 1 is a perspective view of a metalized ceramic Kiel probe in accordance with a first exemplary but nonlimiting embodiment of the invention;

FIG. 2 is a perspective view of a metalized ceramic Kiel probe fitted with a sleeve or adaptor about the metalized portion of the probe;

FIG. 3 is a longitudinal section view of the Kiel probe shown in FIG. 2;

FIG. 4 is perspective view of a gas turbine nozzle to which is attached a plurality of metalized ceramic Kiel probes of the type shown in FIG. 1;

FIG. 5 is a perspective view of a pressure sensor rake mounting a metalized ceramic Kiel probe in accordance with another exemplary but nonlimiting embodiment; and FIG. 6 is a partial perspective view of a gas turbine transition piece into which a pressure sensing rake of the type shown in FIG. 3 has been inserted and bonded.

DETAILED DESCRIPTION OF THE INVENTION

With initial reference to FIG. 1, the Kiel probe 10 includes a shroud or housing 12 enclosing a pressure-sensing cable or tubing, represented at 14, with a sensing tip represented at 16 located at or adjacent the outer end of the shroud or housing 12. Typically, one or more transverse apertures 18 are formed in the shroud or housing to enable any moisture gathering in the shroud to drain from the shroud so as not to negatively impact the accuracy of the Kiel probe.

It will be understood that the pressure sensing cable or tubing 14 and the pressure-sensing tip 16 form no part of the invention in that they are well-known in the art. This invention has to do with the composition of the shroud or housing 12 of the Kiel probe 10 and the manner in which the Kiel probe shroud or housing is attached to a metal turbine component or a metal instrumentation rake as described further below.

In accordance with an exemplary but nonlimiting embodiment of the invention, the Kiel probe shroud or housing 12 is formed of a high-temperature ceramic material. In order to bond the ceramic Kiel probe shroud or housing to a metal component, at least a portion of the ceramic shroud indicated at 20 in FIG. 1, is metalized to facilitate bonding the probe to a metal turbine component or instrumentation rake.

In the exemplary embodiment, the Kiel probe shroud or housing 12 is comprised of silicon carbide (Sic). More specifically, it has been found that silicon carbide not only withstands the high-pressure/temperature environment of a turbine engine hot gas path, but also is easily machined. In addition, a portion of the SiC shroud can be laced with a metal alloy so that the shroud can be bonded with a metal alloy turbine component or pressure-sensing rake. The entire length of the Kiel probe shroud need not be metalized. It is only required that the metalized portion be of sufficient extent to enable the desired bonding with the metal alloy component or device to which the Kiel probe is to be attached. Thus, an axially-extending portion 20 of the substantially cylindrical silicon carbide Kiel probe shroud or housing 12 shown in FIG. 1, representing about 30-50% of the length of the shroud, can be metalized by any conventional and known metallization process, for example, vapor deposition, vacuum heat furnace/thermal spraying, active metallization, etc. The metal used in the metallization process is application and host material specific. In many turbine-related applications, the host material is a high temperature Nickel alloy, but Cobalt alloys are sometimes employed as well.

While the probe 10 has been shown to have a right-cylinder shape, it may have other shapes such as tapered or conical, etc. along all or part of its length dimension.

Figure 2:
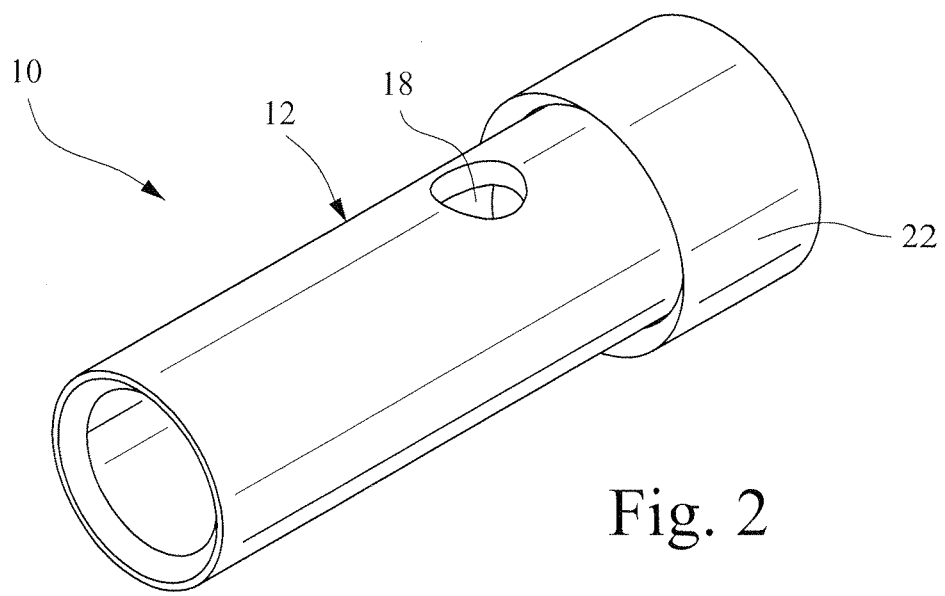
Figure 3:
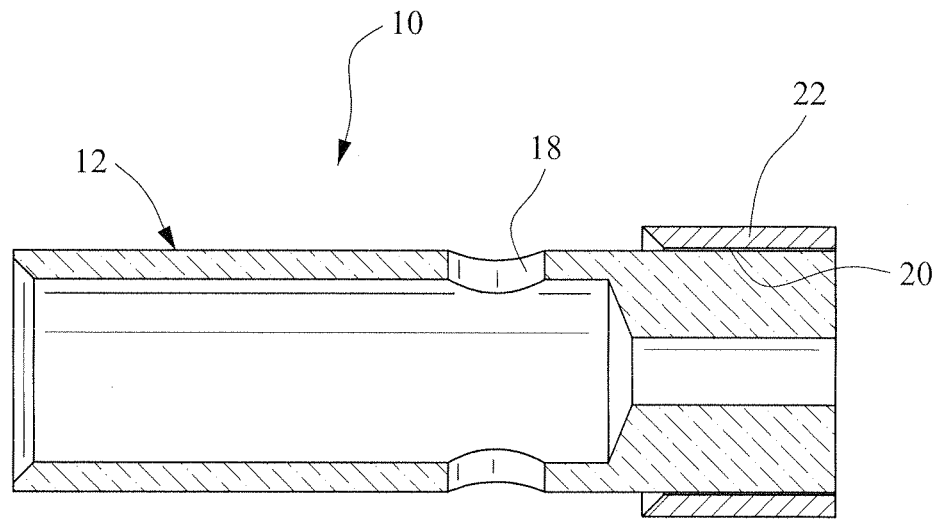

In an exemplary but non-limiting embodiment, and as best seen in FIGS. 2 and 3, a metal sleeve or adaptor 22 may be formed and coated on its interior with a glass fiber composite. After the metal sleeve 22 is inserted over a portion (e.g., portion 20) of the ceramic Kiel probe shroud or housing 12, it is molecularly bonded under high heat to the underlying SiC material, thus creating the desired metalized ceramic portion 20 that can be more easily bonded to a metal turbine hot gas path component or metal instrumentation rake. The preferred method by which the Kiel probe housing 12 is bonded to the turbine component or instrumentation rake is brazing. The resultant Kiel probe assembly can withstand temperatures up to about 2300° F. typically experienced in modern gas turbine combustors.

Figure 4:
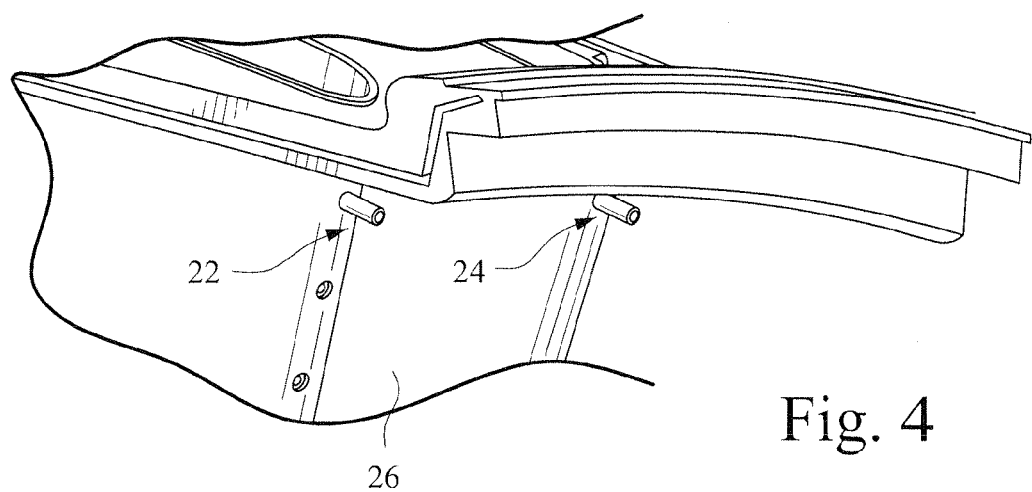

FIG. 4 shows one application for the metalized ceramic Kiel probe 10 of FIG. 1. Here, two such Kiel probes 22 and 24 are brazed within apertures provided in a stationary gas turbine nozzle 26. It will be appreciated that the number, location and/or pattern of Kiel probes on any particular hot gas path component is within the skill of the art.

Figure 5:
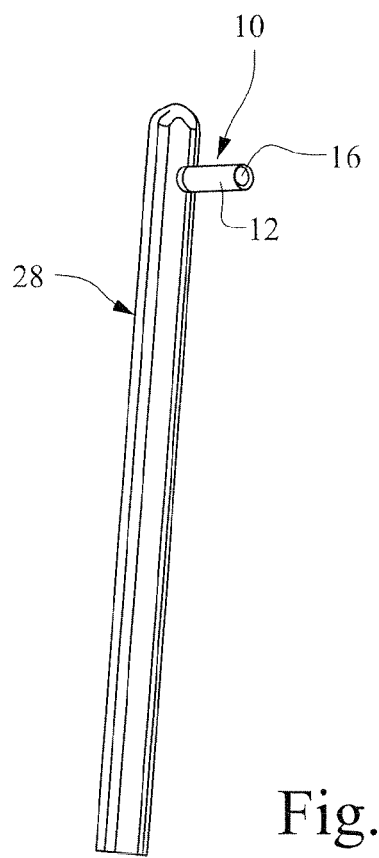

FIG. 5 illustrates another application for the metalized ceramic Kiel probe 10, where the metalized portion 20 of the Kiel probe shroud or housing 12 is brazed to a metal alloy sensor rake 28 that, in turn, may be located so as to project into an aft portion of a gas turbine transition piece 30 (see FIG. 4) which feeds hot combustion gases to the turbine first stage.

Figure 6:
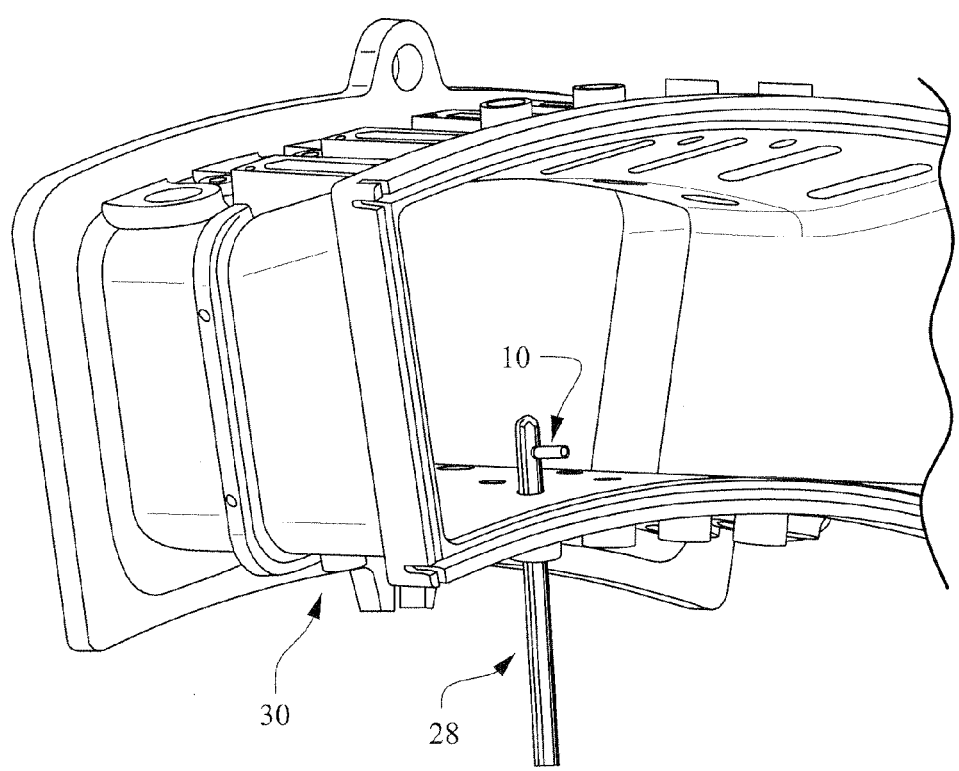

In one exemplary but nonlimiting example, the host metal alloy may comprise Inconel 718, and the host component may be a turbine nozzle or other stator component, a turbine exhaust duct, or an instrumentation rake (or other instrumentation support or holder) secured to an exhaust duct or other turbine structure, e.g. a combustor transition piece as shown in FIG. 6. As noted above, the Kiel probe shroud 12 is composed of SiC, and the metal used in the metallization process is a nickel/silver alloy with silicon added. In this example, the metallization process comprises an active metallization in a one-step vacuum heat treat that molecularly bonds the metallization material to the ceramic. The sleeve or adaptor 22 may be composed of a nickel-chromium based superalloy such as Inconel 718, or other suitable metal, and the subsequent brazing of the probe sleeve to the host component is carried out at a temperature of about 2175° F. A suitable braze material is PALCO (1219° C. Eutectic 65PD-35CO alloy).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A Keil pressure probe comprising:
an elongated cable provided with a pressure sensing tip, and
a ceramic shroud enclosing the pressure sensing tip and a portion of said elongated cable, at least a portion of said ceramic shroud having an outer metalized surface and the metalized surface of said silicon carbide ceramic shroud is configured to be brazed to a metal component.

2. The pressure probe of claim 1 wherein said ceramic shroud comprises silicon carbide.

3. The pressure probe of claim 1 wherein said shroud is provided in the form of an elongated cylinder with at least one open end.

4. The pressure probe of claim 3 wherein said metalized portion of said shroud comprises about 30-50% of a length of said elongated cylinder.

5. The pressure probe of claim 4 wherein metallization of said portion is carried out with a silver/nickel alloy with silicon added.

6. The pressure probe of claim 5 wherein said alloy is molecularly bonded to said ceramic shroud.

7. A pressure probe assembly capable of withstanding temperatures up to about 2300° comprising at least one pressure probe secured to a component, said pressure probe comprising an elongated cable provided with a sensing tip, a portion of said elongated cable and said sensing tip enclosed within a silicon carbide ceramic shroud, said silicon carbide ceramic shroud having at least a portion thereof metalized; the metalized portion of said silicon carbide ceramic shroud brazed to said metal component.

8. The assembly of claim 7 wherein said component comprises a turbine nozzle.

9. The assembly of claim 7 wherein said component comprises a metal instrumentation rake.

10. The assembly of claim 7 wherein said component comprises a turbine combustor transition piece.

11. The assembly of claim 7 wherein said ceramic shroud is comprised of silicon carbide and said portion is metalized with a nickel/silver alloy with silicon added.

12. The assembly of claim 7 wherein said component is comprised of a nickel alloy.

13. A pressure probe assembly comprising at least one pressure probe secured to a metal alloy gas turbine hot gas path component, said pressure probe comprising an elongated cable provided with a sensing tip, a portion of said elongated cable and said sensing tip enclosed within a silicon carbide ceramic shroud, said silicon carbide ceramic shroud having at least a portion thereof metalized; the metalized portion of said silicon carbide ceramic shroud enclosed within a sleeve and brazed to said metal alloy gas turbine hot gas path component.

14. The pressure probe assembly of claim 13 wherein said metal alloy gas turbine hot gas path component comprises a turbine nozzle.

15. The pressure probe assembly of claim 13 wherein said metal alloy gas turbine hot gas path component comprises a gas turbine exhaust duct.

16. The pressure probe assembly of claim 13 wherein said metal alloy gas turbine hot gas path component comprises a turbine combustor transition piece.

17. The pressure probe assembly of claim 13 wherein said portion is metalized with a nickel/silver alloy with silicon added.

18. The pressure probe assembly of claim 13 wherein said metalized portion comprises 30-50% of a length dimension of said silicon carbide ceramic shroud.

19. The pressure probe assembly of claim 18 wherein said sleeve is comprised of a nickel-chromium based superalloy.

20. The pressure probe assembly of claim 13 wherein said alloy gas turbine hot gas path component is composed of a high-temperature nickel alloy.

\* \* \* \* \*

UNITED STATES PATENT AND TRADEMARK OFFICE
CERTIFICATE OF CORRECTION

PATENT NO. : 9,128,005 B2
APPLICATION NO. : 13/632842
DATED : September 8, 2015
INVENTOR(S) : Snider et al.

Page 1 of 1

It is certified that error appears in the above-identified patent and that said Letters Patent is hereby corrected as shown below:

In the specification
Column 2, line 63, change "(Sic)" to --(SiC)--

Signed and Sealed this
Ninth Day of February, 2016

Michelle K. Lee
*Director of the United States Patent and Trademark Office*